United States Patent
Greene

[19]

[11] Patent Number: 5,582,389
[45] Date of Patent: Dec. 10, 1996

[54] DISPOSABLE COOKING UTENSIL

[76] Inventor: David N. Greene, 300 E. 85th St., Apt. 1903, New York, N.Y. 10028

[21] Appl. No.: 263,057

[22] Filed: Jun. 21, 1994

[51] Int. Cl.⁶ ........................................ B28B 7/34
[52] U.S. Cl. ........................ 249/61; 249/117; 249/121; 249/DIG. 1; 229/235; 229/236; 99/DIG. 15
[58] Field of Search .................. 249/61, DIG. 1, 249/117, 121; 99/DIG. 15; 229/201, 235, 236; 426/512

[56] References Cited

U.S. PATENT DOCUMENTS

| | | |
|---|---|---|
| 178,105 | 5/1876 | Brown . |
| 497,606 | 5/1893 | Richardson ............... 249/DIG. 1 |
| 559,788 | 5/1896 | Penott et al. ............... 219/DIG. 1 |
| 572,509 | 12/1896 | Wilson . |
| 1,063,144 | 5/1913 | Wallace . |
| 1,154,972 | 9/1915 | Carlson . |
| 2,039,374 | 8/1934 | Young . |
| 2,259,854 | 10/1940 | Langel . |
| 2,611,250 | 9/1952 | Rodacker . |
| 2,960,218 | 11/1960 | Cheely . |
| 3,107,587 | 10/1963 | Tipton . |
| 3,128,725 | 4/1964 | Becker et al. . |
| 3,179,036 | 4/1965 | Luker . |
| 3,191,520 | 6/1965 | Halter . |
| 3,196,777 | 7/1965 | Luker . |
| 3,262,668 | 7/1966 | Luker . |
| 3,272,112 | 9/1966 | Law . |
| 3,300,118 | 1/1967 | Owens ............... 229/235 |
| 3,402,876 | 9/1968 | Kuchenbecker ............... 229/235 |
| 3,580,484 | 5/1971 | Schneider . |
| 4,111,297 | 9/1978 | Paulin ............... 229/235 |
| 4,644,858 | 2/1987 | Liotto et al. ............... 99/DIG. 15 |
| 5,033,712 | 7/1991 | Ravet ............... 249/61 |
| 5,247,149 | 9/1993 | Peleg ............... 219/10.55 |
| 5,251,819 | 10/1993 | McHugh ............... 229/236 |
| 5,398,908 | 3/1995 | Kieule ............... 249/121 |

*Primary Examiner*—Khanh P. Nguyen
*Attorney, Agent, or Firm*—Peter DeLuca

[57] ABSTRACT

A cooking utensil has a base portion and a wall portion, wherein at least the wall portion is disposable after a single use. The wall portion includes a score line for irreversibly forming an opening in the wall portion. Tabs may be provided on either side of the score line for facilitating opening of the wall portion along the score line.

13 Claims, 3 Drawing Sheets

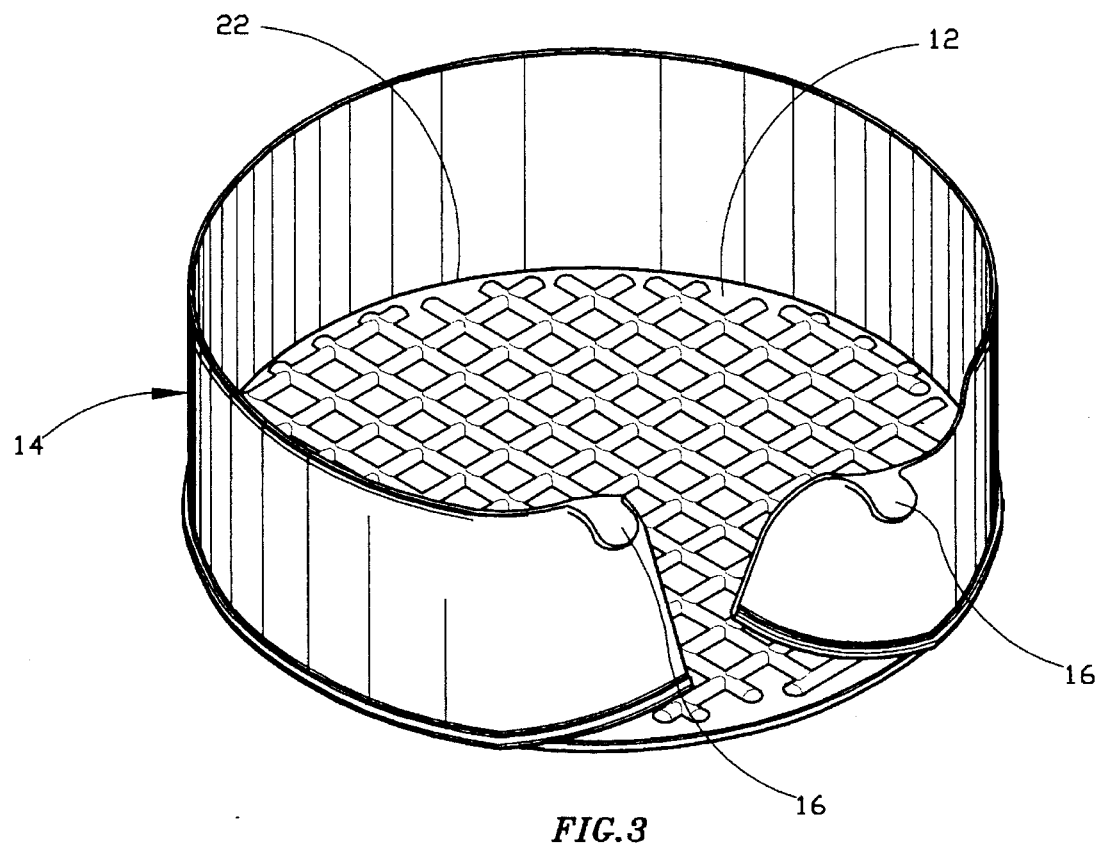
FIG. 3
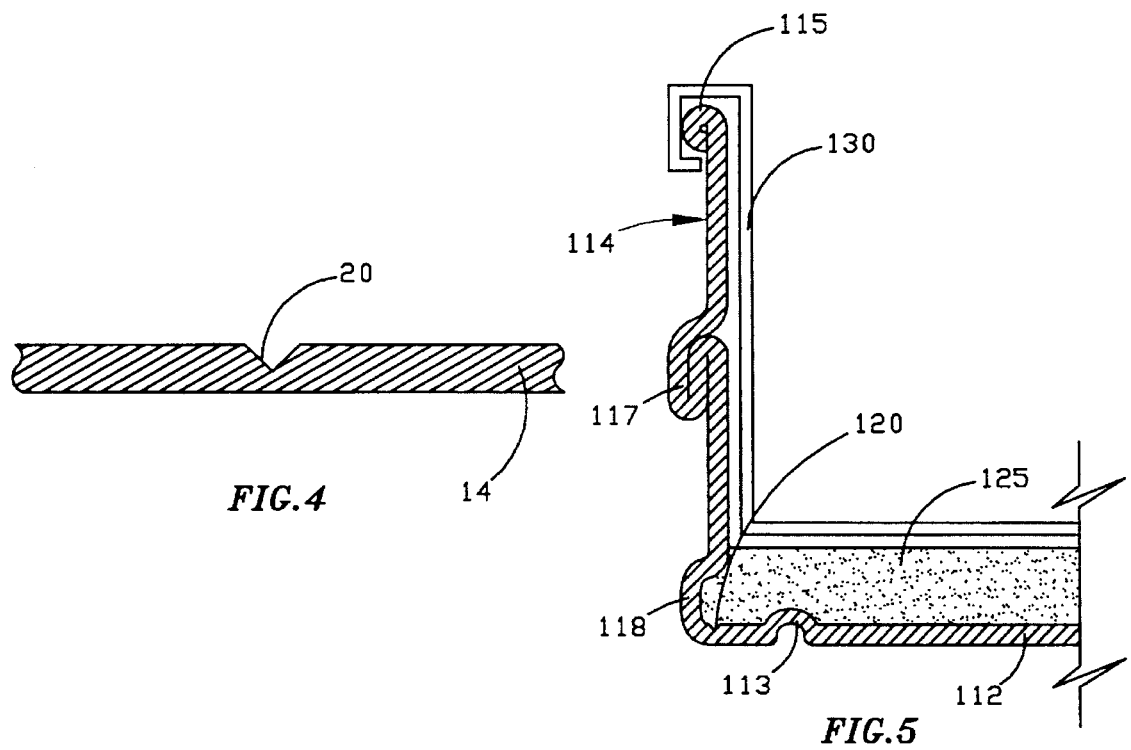
FIG. 4
FIG. 5

DISPOSABLE COOKING UTENSIL

FILED OF THE INVENTION

This invention relates generally to cooking utensils. More particularly, this invention relates to cake pans, at least a part of which is disposable.

BACKGROUND OF THE INVENTION

Spring-form cake pans are used for preparing a variety of bakery goods including, for example, cheesecakes. A spring-form pan generally includes a base and a wall portion. The wall portion is secured to the base to provide a mold or container into which batter or some other edible composition can be placed for baking. Once baking is complete, the wall portion is removed from the base to provide access to the cake. Normally, the wall portion opens in some way, thereby allowing easy removal from the base and easy separation from the baked goods. A wall portion that opens must, of course, include some mechanism for maintaining the wall portion in a closed position and adequately secured to the base so that the uncooked batter does not leak out of the pan.

A variety of mechanisms are known for allowing removal of the wall portion from the base. Latches, clasps, pins, tabs and spring-loaded mechanisms have all been used to releasably secure the wall portion of a pan to a base. The following patents show such mechanisms: U.S. Pat. Nos. 178,105; 572,509; 1,063,144; 1,154,972; 2,259,854; 2,611,250; 2,960,218; 3,107,587; and 3,128,725. The cost for materials and labor to manufacture closure mechanisms vary, but are easily justifiable due to the reusable nature of the pan.

Disposable cake pans have also been designed. See, for example, U.S. Pat. Nos. 3,196,777; 3,179,036; 3,191,520; and 3,262,668. None of the pans in these patents include any mechanism for forming an opening in the wall of the pan or any closure mechanism for re-forming the wall portion. In manufacturing a disposable pan, apparently, the cost of providing such closure mechanisms is too great to allow only a single use prior to disposal.

It would be desirable to provide a low cost, easy to manufacture, disposable cake pan wherein the wall portion can be easily separated from the base and also from the baked goods.

SUMMARY OF THE INVENTION

The present invention provides a cooking utensil having a base portion and a wall portion, wherein at least the wall portion is disposable after a single use. The wall portion is detachably connected to the base portion around the periphery thereof. In one embodiment, the wall portion is formed monolithically with the base portion and a score line around the periphery of the base portion allows the wall portion to be detached therefrom. In another embodiment, the lower edge portion of a wall member includes securement means for detachably connecting the disposable wall member to a base member which is preferably reusable. In a particularly useful embodiment, the securement means is a channel formed adjacent the lower edge of the wall member.

In each embodiment, the wall portion includes parting means for irreversibly forming an opening in the wall portion. Preferably, a score line serves the parting means. Gripping means may be provided adjacent the score line for facilitating opening of the wall portion along the score line.

The pan of this invention may include an edible composition at least partially covering the base portion. The edible composition can be, for example, a composition which, when cooked, forms a crust, Where an edible composition is disposed in the pan, a cover member is preferably provided to protect the edible composition from contamination.

BRIEF DESCRIPTION OF THE DRAWINGS

FIG. 3 is a perspective view of the embodiment of FIG. 1 with the wall portion partially separated from the base portion;

FIG. 4 is a partial cross-sectional view of the embodiment of FIG. 1 showing the score line formed in the wall portion;

FIG. 5 is a partial cross-sectional view of an alternate embodiment of a cooking utensil in accordance with this invention;

DESCRIPTION OF PREFERRED EMBODIMENT

The present invention provides a low cost, easy to manufacture, disposable cooking utensil. While the cooking utensil of this invention will be described herein as a cake pan, it should be understood that the cooking utensil of this invention can be employed to prepare items other than bakery goods. In addition, while the following discussion refers only to batter, it should be understood that any edible composition may be placed into the cake pan of this invention. Likewise, while the discussion hereinafter is couched in terms of baking, it should be understood that the cake pan of this invention may be subjected to any technique by which the composition placed in the pan is cooked, hardened, set or cured.

Figure 1:
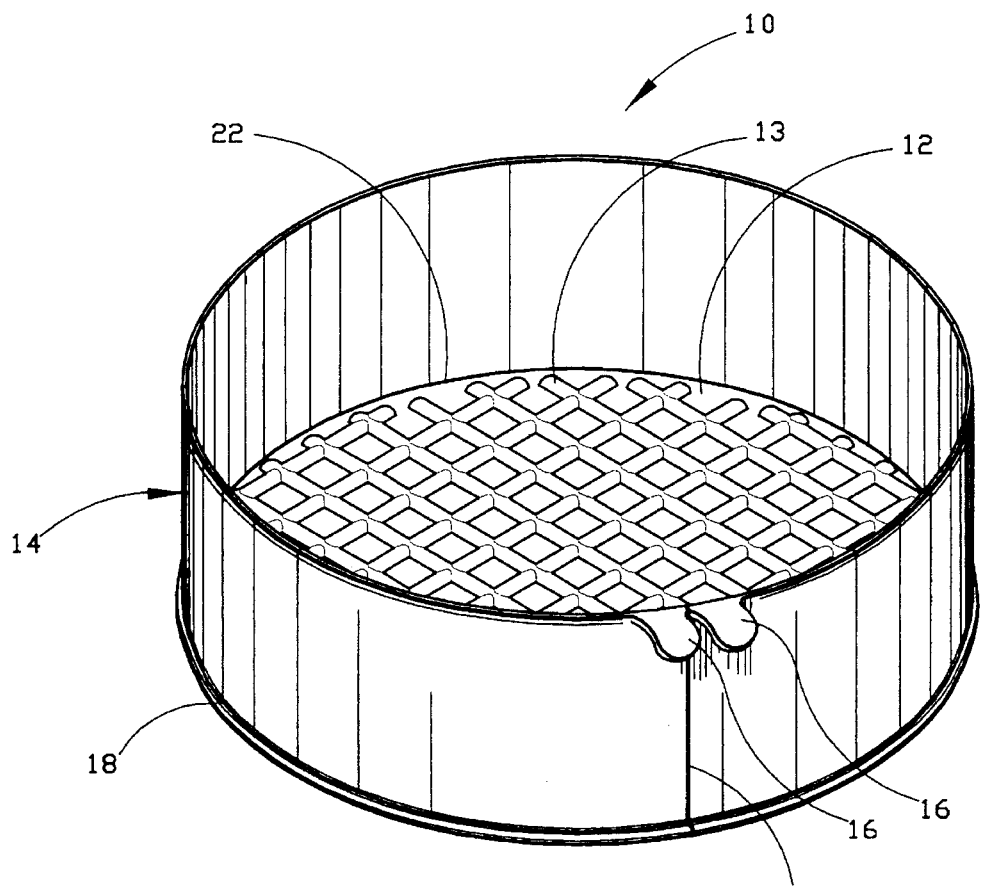
FIG. 1 is a perspective view of one embodiment of a cooking utensil in accordance with this invention.

Referring now to FIG. 1, a pan in accordance with the present invention is generally denoted by the numeral 10 and includes base portion 12 monolithically formed with wall portion 14. Ribs 13 formed in base portion 12 increase the rigidity thereof. Ribs 13 may be formed in a random pattern or in a regular, geometric pattern as shown in FIG. 1. Rib 18 increases the rigidity of wall portion 14.

Parting means, such as score line 20, is provided for irreversibly forming an opening in wall portion 14. Tabs 16 are located on either side of score line 20 and constitute gripping means for facilitating opening of wall portion 14 along score line 20. Wall portion 14 is detachable from base portion 12 via score line 22 formed around the periphery of base portion 12. The top edge of wall portion 14 defines an opening into which batter is placed.

Figure 2:
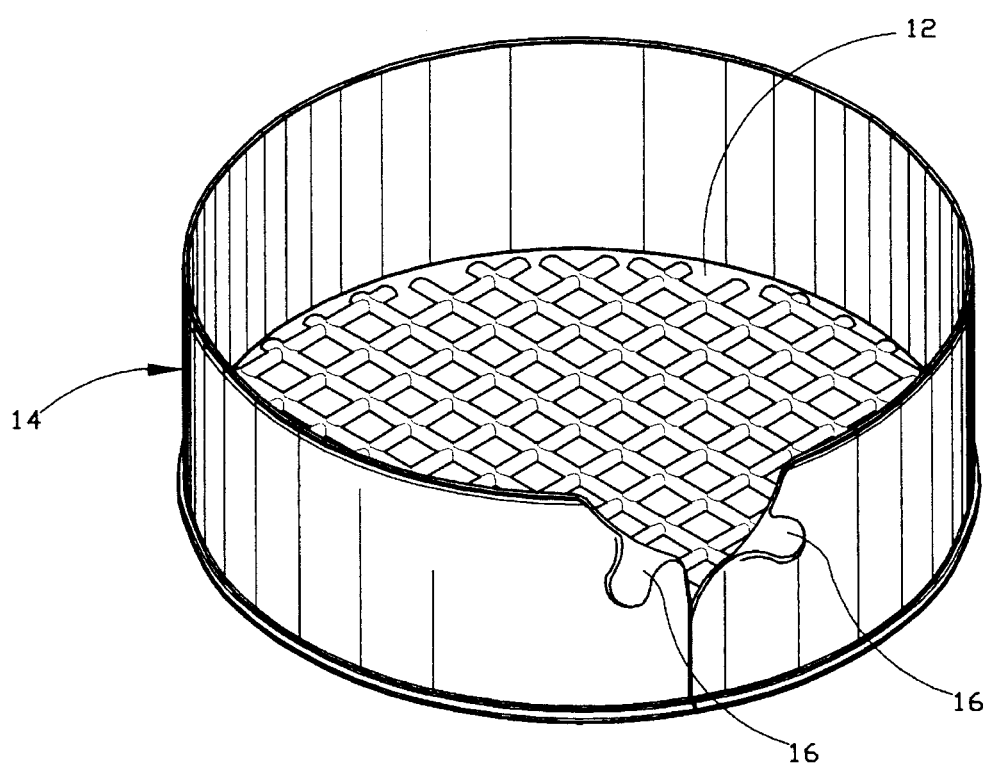
FIG. 2 is a perspective view of the embodiment of FIG. 1 with the wall portion partially opened.

In use, the pan 10 is at least partially filled with batter. Once the cake is baked, wall portion 14 is removed from base portion 12. By pulling on tabs 16, wall portion 14 begins to open along score line 20 as shown in FIG. 2. Once the opening in wall portion 14 reaches the lower edge thereof, continued pulling on tabs 16 causes wall portion 14 to begin to separate from base portion 12. (See FIG. 3.) Eventually, wall portion 14 is completely separated from base portion 12. Once removed, wall portion 14 is discarded.

Since in this embodiment the wall portion 14 is permanently separated from and cannot be re-attached to base portion 12, the base portion is also discarded.

As previously mentioned, wall portion 14 and base portion 12 are monolithically formed. Thus, the pan 10 of the embodiment shown in FIGS. 1–3 can advantageously be formed from a single sheet of aluminum using techniques well known to those skilled in the art, such as drawing, molding, punching, stamping and scoring. Sheet aluminum having a thickness in the range 0.002 to 0.040 inches is relatively easily deformable is particularly useful in making cooking utensils in accordance with the present invention. While aluminum is the preferred material of construction for the pan of this invention, it should be understood that any material which; (i) can withstand the conditions employed to cook, set or harden the composition placed within the pan; and (ii) can be provided with parting means can be used. Thus, for example, where the utensil is used as a mold for jello, mousse or frozen or chilled desserts, the utensil can advantageously be manufactured from polymeric materials including, but not limited to polyolefins (e.g., polypropylene, polyethylene) or polyethyleneterephthalate.

Turning now to FIG. 5, another embodiment of a cake pan in accordance with this invention is shown and includes wall portion 114 monolithically formed with base portion 112. Structure may be provided to increase the rigidity of the base and wall portions as in the previously described embodiment. Thus, ribs 113 increase the rigidity of base portion 112 and rib 118 and folds 117 increase the rigidity of wall portion 114. Wall portion 114 is detachable from base portion 112 via score line 120 formed around the periphery of base portion 112.

A curl 115 formed at the upper edge of wall portion 114 not only strengthens the upper edge of the pan but also provides means for securing a protective element such as cover member 130 to the pan. Cover member 130 inhibits damage to the interior of the pan which may result, for example, from nesting one pan within another during shipping or storage of the pans. Cover member also prevents contamination of any edible composition, such as crust layer 125, which may be present inside the pan. Cover member 130 may also have a logo, words or other informational or decorative indicia formed thereon or attached thereto. Preferably, cover member 130 is made from a clear plastic material which can be secured to the pan by being snap fit onto the lip formed by curl 115.

Use of the pan shown in FIG. 5 is essentially the same as that described above with respect to FIGS. 1–3, except that cover member 130 is removed from the pan prior to filling the pan with batter.

Figure 6:
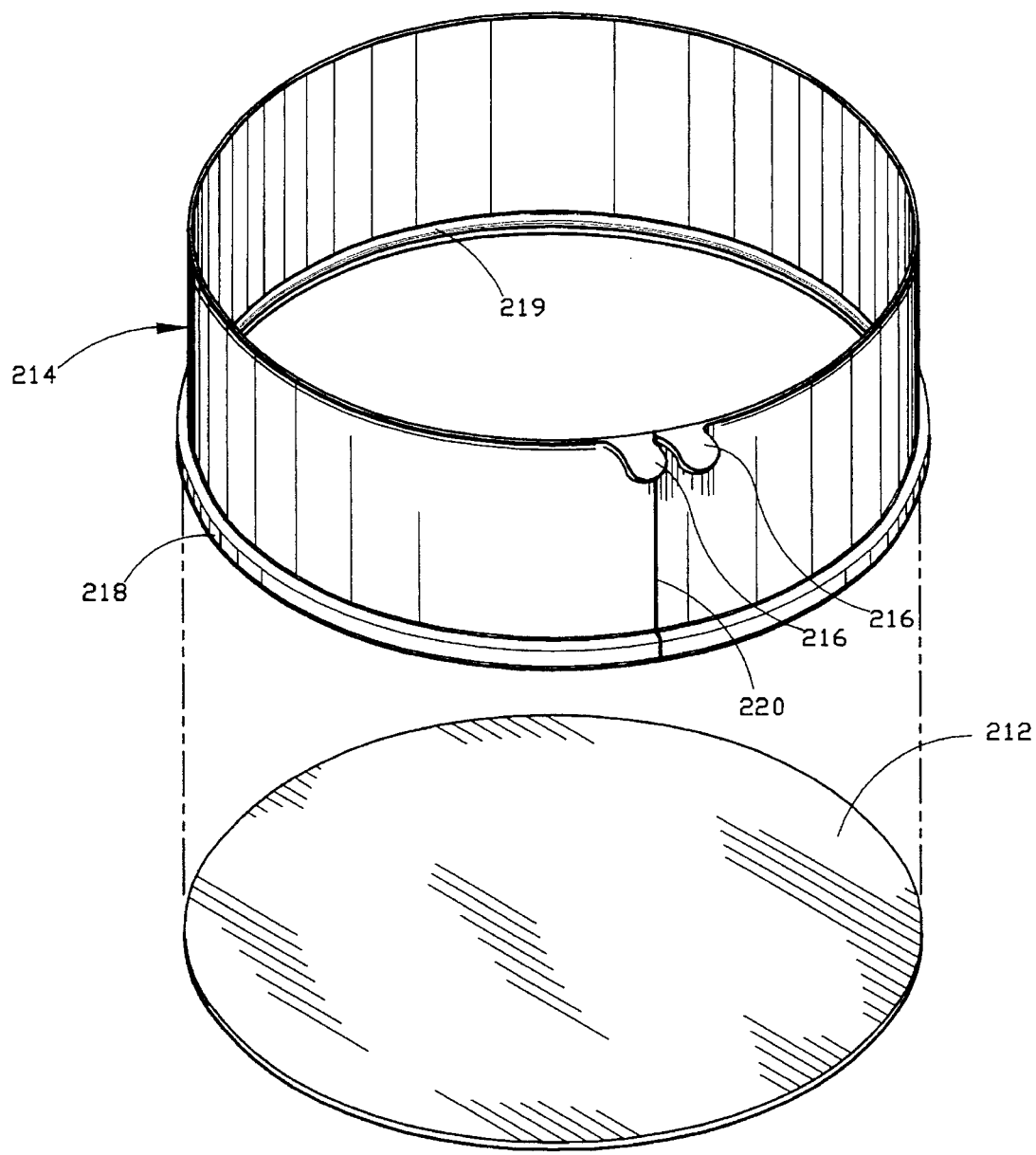
FIG. 6 is an exploded perspective view of another embodiment of a cooking utensil in accordance with this invention.
Figure 7:
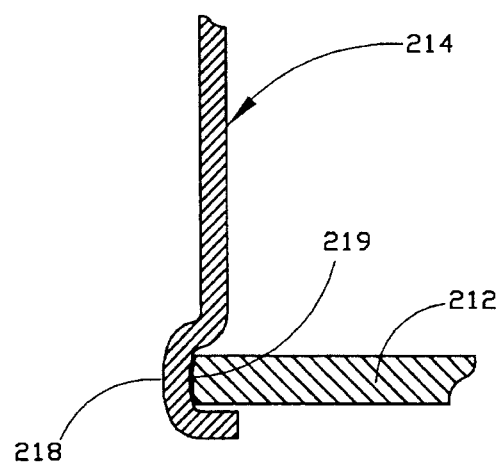
FIG. 7 is a partial cross-sectional view of the embodiment of FIG. 6.

FIG. 6 shows another embodiment of this invention wherein wall member 214 is disposable, but base member 212 is reusable. Wall member 214 has score line 220 formed therein. Tabs 216 are located on either side of score line 220. Rib 218 formed adjacent the lower edge of wall member 214 not only increases the rigidity of wall member 214, but also forms annular channel 219. Channel 219 is dimensioned and configured to receive base member 212 in a snap fit. (See FIG. 7.)

To use the pan of this embodiment, base member 212 is snapped into channel 219 to form a container capable of holding batter. A desired amount of batter is then placed into the pan. Once the cake is baked, an opening is formed in wall member 214 by pulling on tabs 216 as has been described with respect to other embodiments. Eventually, an opening along score line 220 is formed which extends all the way from the upper edge to the lower edge of wall member 214. Wall member 214 can then be easily removed from base member 212, easily separated from the baked goods contained within the pan and discarded. Base member 212, however, is reusable after the baked item previously prepared in the pan is removed from the base member. Thus, it is contemplated that a kit for preparing a plurality of baked goods can be provided by packaging a plurality of wall members 214 with a single base member 212.

While the above description contains many specific details of pans in accordance with this invention, these specifics details should not be construed as limitations on the scope of the invention, but merely as exemplifications of preferred embodiments thereof. Thus, for example, while the pans have been described and shown as having a circular base portion and a substantially cylindrical wall portion, it is contemplated that the base portion may have virtually any shape and that the wall portion will have a corresponding configuration. As another example, the wall portion need not be substantially perpendicular to the base portion as shown, but rather may have a curved or sculpted shape. For that matter, the base portion need not be substantially planar as shown in the figures, but rather may be wavy or curved. Those skilled in the art will envision many other possible variations that are within the scope and spirit of the invention as defined by the claims appended hereto.

I claim:

1. A cooking utensil comprising:

a base portion;

a single use wall portion having an upper edge portion and a lower edge portion, the lower edge portion being detachably connected to the base portion around the periphery of the base portion, the wall portion including parting means extending from the upper edge portion to the lower edge portion of the wall potion for irreversibly forming an opening in the wall portion such that the wall portion can be detached from the base portion as a unitary structure, wherein the base portion is formed monolithically with the wall portion and further comprising a score line extending around the periphery of the base portion.

2. A cooking utensil as in claim 1 further comprising gripping means for facilitating the formation of an opening in the wall portion along the score line.

3. A cooking utensil as in claim 1 further comprising base reinforcement means for increasing the rigidity of the base portion.

4. A cooking utensil as in claim 1 further comprising wall reinforcement means for increasing the rigidity of the wall portion.

5. A cooking utensil as in claim 1 further comprising an edible composition positioned adjacent at least a portion of the base member.

6. A cooking utensil as in claim 1 further comprising protecting means for covering at least a portion of the cooking utensil, the protecting means having a first portion that is substantially parallel to and co-extensive with the wall portion and a second portion that is substantially parallel to the base portion.

7. A cooking utensil as in claim 6 wherein the protecting means comprises a base covering portion, a wall covering portion and securement means for releasably securing the protecting means to the cooking utensil.

8. A cooking utensil as in claim 1 wherein the base portion is substantially planar.

9. A cooking utensil as in claim 1 wherein the base portion is circular in shape and the wall portion is substantially cylindrical in shape.

10. A cake pan comprising:

a wall portion having an upper edge and a lower edge, the wall portion being monolithically formed with a base portion such that the lower edge of the wall portion is connected to the periphery of the base portion;

a first score line formed around the periphery of the base portion providing a line of weakness along which the wall portion may be separated from the base portion; and a second score line extending from the upper edge of the wall portion to the first score line, the second score line providing a line of weakness in the wall portion along which a permanent opening in the wall portion can be formed.

11. A cake pan as in claim 10 further comprising gripping means for facilitating the formation of an opening in the wall portion along the score line.

12. A cake pan as in claim 10 wherein the base portion is circular in shape and the wall portion is substantially cylindrical in shape.

13. A cake pan as in claim 10 which is formed from a single sheet of aluminum.

* * * * *